United States Patent [19]
Sterling

[11] 3,837,096
[45] Sept. 24, 1974

[54] MATH BOARD

[76] Inventor: Alice W. Sterling, P.O. Box 546-B, Rt. 2, Huntersville, N.C. 28078

[22] Filed: Feb. 12, 1973

[21] Appl. No.: 331,833

[52] U.S. Cl. .................................. 35/31 D, 35/32
[51] Int. Cl. ......................................... G09b 19/02
[58] Field of Search ...... 35/31 R, 31 D, 31 F, 31 G, 35/32, 22 A, 69, 70, 71, 72, 73

[56] References Cited
UNITED STATES PATENTS

| | | | |
|---|---|---|---|
| 2,304,893 | 12/1942 | Dickson | 35/31 D |
| 2,723,465 | 11/1955 | Silverstein | 35/22 A X |
| 3,381,394 | 5/1968 | Munro | 35/31 F |
| 3,387,389 | 6/1968 | Weirauch | 35/31 R |

FOREIGN PATENTS OR APPLICATIONS

| | | | |
|---|---|---|---|
| 700,095 | 11/1953 | Great Britain | 35/35 H |
| 6,064 | 1915 | Great Britain | 35/73 |
| 5,008 | 1900 | Great Britain | 35/31 D |
| 75,650 | 2/1919 | Austria | 35/73 |
| 1,089,613 | 11/1967 | Great Britain | 35/22 A |

Primary Examiner—Wm. H. Grieb
Attorney, Agent, or Firm—Donnelly, Maky, Renner & Otto

[57] ABSTRACT

A math board for children of ages 2–7 having indentations of different colors to receive correspondingly colored Arabic numerals and having groups of indentations to receive correspondingly colored sets of marbles, golf tees, washers, and dowels, the numeral indentations further having golf tee indentations corresponding in number to the respective numerals, and the numerals having perforations therethrough registering with the golf tee indentations in the numerals. The math board herein is further characterized in that it comprises hinged together panels for folding to a size corresponding to the size of the compartmentalized tray in which the respective numerals, marbles, golf tees, washers and dowels are stored.

7 Claims, 4 Drawing Figures

PATENTED SEP 24 1974

3,837,096

MATH BOARD

SUMMARY OF THE INVENTION

It is a principal object of this invention to provide a math board to teach math to young children by association of Arabic numerals with corresponding numbers of different objects, the board having indentations to receive the numerals and having groups of indentations corresponding in number to the respective numerals to receive the different objects with the groups of indentations being arranged to show the effects of addition and subtraction.

Other objects and advantages will appear from the ensuing description.

DETAILED DESCRIPTION OF THE DRAWING

Figure 4:
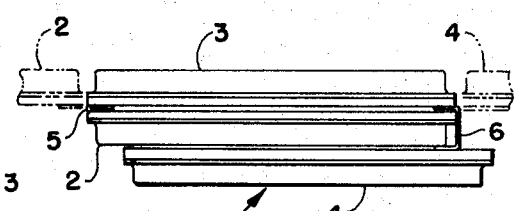
FIG. 4 is an end elevation view showing how the math board may be folded to a compact size corresponding approximately to the size of the compartmentalized tray.

Referring now in detail to the drawing the math board 1 herein comprises three sections 2, 3, and 4 (for example, vacuum formed plastic sheets backed up by cardboard cemented around the flanges of said sections 2, 3, and 4) which are hinged together as by fabric, flexible plastic, or paper hinges 5 and 6 for folding together as in FIG. 4 so as to be of a size approximately the same as the compartmentalized vacuum formed or molded plastic tray 7 which contains sets of Arabic numerals 8, golf tees 9, marbles 10, washers 11, and dowels 12 as shown. The bottom section 2 has different colored Arabic numeral indentations 14, each of which has a golf tee indentation or indentations 15 corresponding in number to the respective numeral. The middle section 3 has groups of dowel indentations 16 and groups of washer indentations 17, the number and colors of the indentations 16 and 17 in each group corresponding to the respective numeral indentations 14, with group 17 being arranged in order of increasing numbers of object indentations corresponding to the numerical value of numeral indentations 14, and with group 16 being arranged in reverse order. The top section 4 has groups of golf tee and marble indentations 18 and 19 corresponding in number and color to the respective dowel and washer indentations 16 and 17, with group 19 being arranged in the same order as group 17, and group 18 arranged in the same order as group 16.

The numerals 8 which are adapted to be fitted into the numeral indentations 14 are of colors corresponding with the colors of the respective numeral indentations 14 and the numerals 8 have openings 20 therethrough which register with the golf tee indentations 15. In the present case, when the numerals 8 are "1", "2", "3", "4", and "5", there will preferably be provided sets of 15 golf tees 9, marbles 10, washers 11, and dowels 12 with one of each set of the same color as the numeral "1", two of each set of the same color as the numeral "2", three of each set of the same color as the numeral "3", four of each set of the same color as the numeral "4", and five of each set of the same color as the numeral "5".

Figure 1:
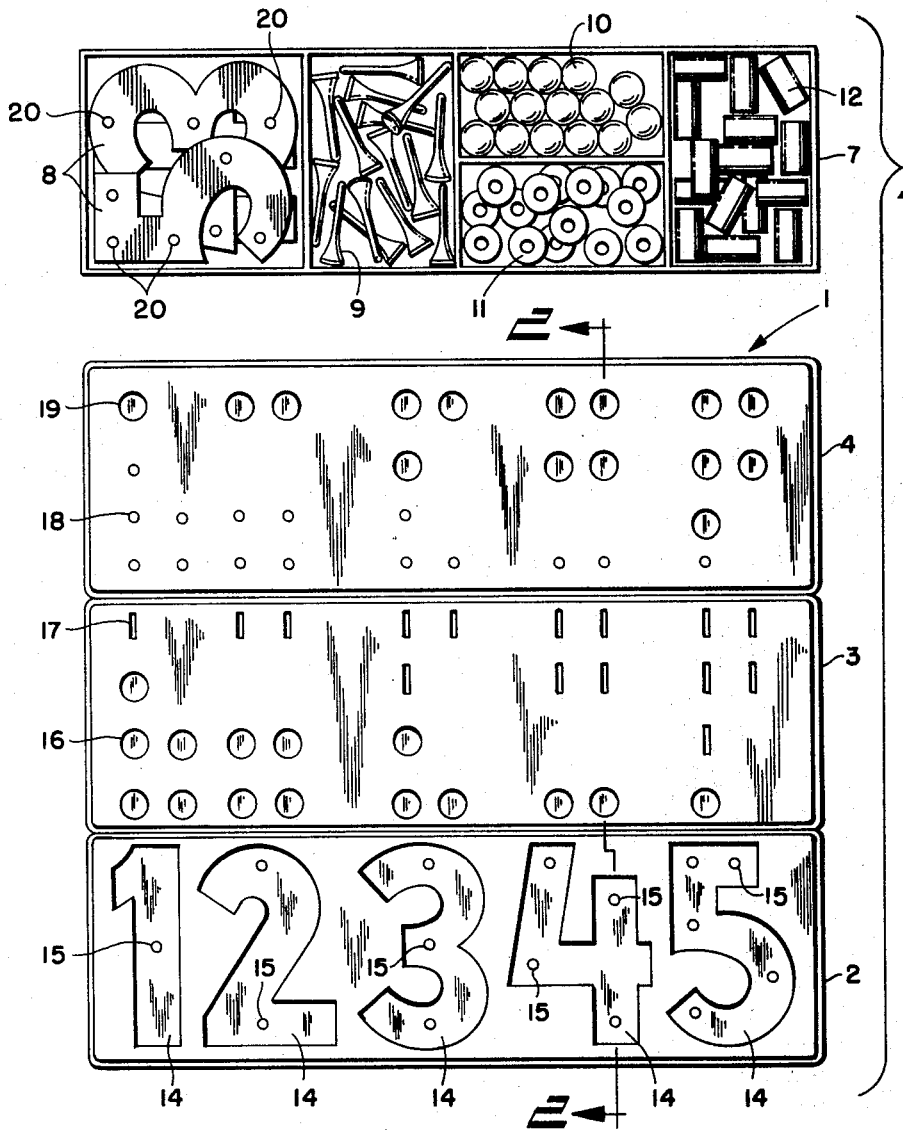
FIG. 1 is a top plan view of the math board herein and the compartmentalized tray which contains the Arabic numerals and the sets of different objects used with the board.
Figure 2:
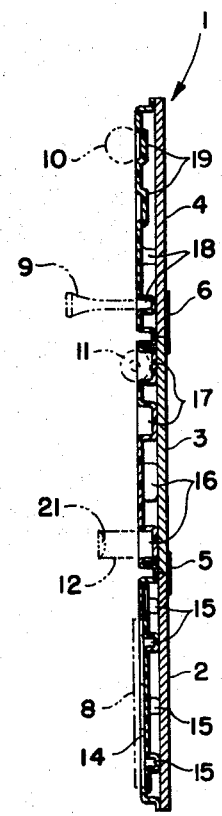
FIG. 2 is a cross-section view taken substantially along the line 2—2, FIG. 1.

The golf tee indentations 15 and 18 in sections 2 and 4 are designed to snugly receive the small ends of the tees 9 which, for safety, are blunted or rounded, and the marble indentations 19 in section 4 are of diameter and depth as shown in FIG. 2 to receive the marbles 10 to retain them but yet permit easy removal. The washer indentations 17 in section 3 are designed to support the washers 11 in vertical position, the holes in the washers being large enough for passage of the small ends of the tees 9 therethrough. The dowel indentations 16 in section 3 are designed to snugly receive the dowels 12 and preferably one or both ends of the dowels 12 have concave configurations 21 for supporting marbles 10. The holes 20 in the numerals 8 register with the golf tee indentations 15 in the numeral indentations 14 in section 2 for passage of the small ends of the tees 9 through the holes 20 into the tee indentations 15. The tee indentations 15 are located so that the numerals 8 may be balanced in elevated position above the math board 1 by the tee 9 or tees 9.

Figure 3:
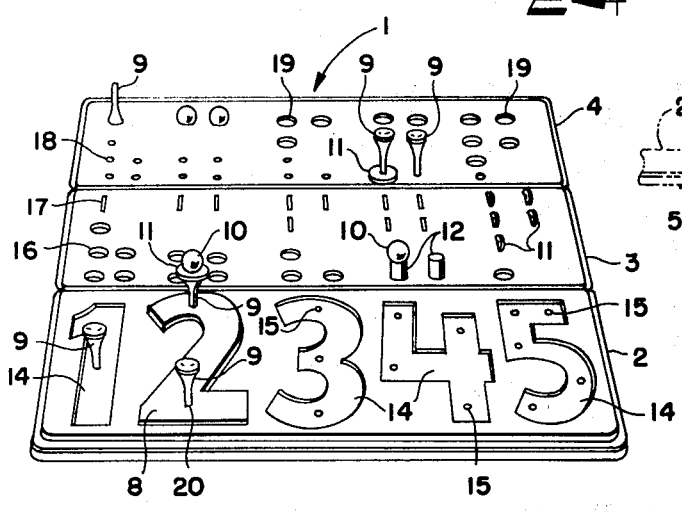
FIG. 3 is a perspective view of the math board illustrating various combinations of the different objects.

To facilitate insertion and removal of the numerals 8 into and from the numeral indentations 14, the numerals 8 are thicker than the numeral indentations 14. FIG. 3, of course, is merely illustrative, showing the numeral "2" in the corresponding numeral indentation 14 with tees 9 extending through the two holes 20 in the numeral "2" into the tee indentations 15, and, in addition, one of the tees 9 has a washer 11 and marble 10 on the top thereof. FIG. 3 also shows a tee 9 upside down in one of the marble indentations 19, a tee 9 with a washer 11 therearound, and a marble 10 supported on a dowel 12.

If desired, the math board 1 may be made of a single sheet of vacuum formed plastic backed up by a cardboard or plastic sheet cemented or heat sealed to the periphery of the vacuum formed sheet and to the bottoms of the indentations 15, 16, 17, and 18. In lieu of the vacuum formed sheet or sections 2, 3, and 4, the same may be made of different materials such as wood or foamed plastic.

In summary, the math board 1 herein provides a multitude of ways of associating Arabic numerals 8 with numbers and arrangements of groups of indentations 15 to 19 to reveal how successive numbers add to or subtract from the adjacent numbers. Moreover, the color coding facilitates the understanding that the numeral "1" means one tee 9, one marble 10, or one washer 11 or one dowel 12 by the match up of color and that the numeral "2" is the equivalent of two tees 9, two marbles 10, two washers 11, or two dowels 12 by the match up of color, etc. With reference to the dowels 12 they may of course be of non-circular cross-section if desired so as not to roll and the equivalent of a concave end 21 or ends thereon may be produced by using a tubular dowel, in which case, a marble 10 may be supported thereon or a tee 9 may be inserted into a dowel 12 to provide additional limitless combinations of the several different objects which are a part of the present math board 1.

The embodiments of the invention in which an exclusive property or privilege is claimed are defined as follows:

1. A math board comprising a board having a series of numeral indentations corresponding to a series of Arabic numerals, and a plurality of different groups of object indentations separate from said numeral indentations and wherein each group consists of object indentations corresponding in number to the numerical values of the respective numeral indentations; a set of Arabic numerals to fit in the numeral indentations and a plurality of sets of different objects which are adapted to be received in the respective plurality of groups of object indentations in said board; said numeral indentations being arranged in order of increasing numerical value, at least one of said groups of object indentations being arranged in order of increasing numbers of object indentations corresponding to the numerical value of said numeral indentations, and another of said groups of object indentations being arranged in reverse order relative to said one group.

2. The math board of claim 1 wherein said numerals are of different colors and wherein said numeral indentations are of corresponding colors; and wherein said sets of different objects comprise corresponding numbers of colored objects having the same colors as the respective numerals and numeral indentations.

3. The math board of claim 1 wherein said numeral indentations have additional indentations in the bottoms thereof corresponding in number to the respective numeral indentations for receipt in such additional indentations the objects comprising one set of said objects.

4. The math board of claim 3 wherein said one set of objects are golf tees of which the small ends are adapted to be received in a corresponding group of indentations and also in said additional indentations.

5. The math board of claim 4 wherein said numerals have openings therein which when inserted in the respective numeral indentations register with such additional indentations whereby the small ends of said tees may be inserted through said numeral openings into said additional indentations.

6. The math board of claim 1 comprising hinged together sections of which one section has said numeral indentations therein and another section has said one group and said another group of object indentations therein.

7. The math board of claim 6 comprising an additional section hinged to one of said hinged together sections, and having another plurality of different groups of object indentations arranged respectively in order of increasing numbers of object indentations corresponding to the numerical value of said numeral indentations and in reverse order.

* * * * *